US008826365B2

(12) United States Patent
Van Noetsele

(10) Patent No.: US 8,826,365 B2
(45) Date of Patent: Sep. 2, 2014

(54) MEDIA PLAYOUT SYSTEM

(75) Inventor: Robert Van Noetsele, Middlebeers (NL)

(73) Assignee: UPC Broadband Operations BV, Schiphol-Rijk (NL)

( * ) Notice: Subject to any disclaimer, the term of this patent is extended or adjusted under 35 U.S.C. 154(b) by 1244 days.

(21) Appl. No.: 10/383,926

(22) Filed: Mar. 7, 2003

(65) Prior Publication Data

US 2004/0003414 A1    Jan. 1, 2004

(30) Foreign Application Priority Data

Mar. 7, 2002 (GB) .................................. 0205402.1

(51) Int. Cl.
*H04N 7/16* (2011.01)
*H04N 21/222* (2011.01)
*H04N 21/226* (2011.01)
*H04N 21/81* (2011.01)
*H04N 21/20* (2011.01)
*H04N 21/262* (2011.01)
*H04N 21/21* (2011.01)
*H04N 21/242* (2011.01)
*H04N 21/237* (2011.01)

(52) U.S. Cl.
CPC ............. *H04N 7/165* (2013.01); *H04N 21/222* (2013.01); *H04N 21/226* (2013.01); *H04N 21/8126* (2013.01); *H04N 21/20* (2013.01); *H04N 21/26216* (2013.01); *H04N 21/21* (2013.01); *H04N 21/262* (2013.01); *H04N 21/242* (2013.01); *H04N 21/26208* (2013.01); *H04N 21/237* (2013.01)
USPC ........... 725/146; 725/143; 725/144; 725/145; 725/135; 725/136

(58) Field of Classification Search
CPC ... H04N 21/20; H04N 21/262; H04N 21/647; H04N 21/21; H04N 21/222; H04N 21/226; H04N 21/237; H04N 21/242; H04N 21/26208; H04N 21/26216; H04N 21/8126
USPC ............. 725/32–36, 92, 93, 94, 95, 105–110, 725/100, 115, 116, 131, 139, 151, 143–146, 725/135–136
See application file for complete search history.

(56) References Cited

U.S. PATENT DOCUMENTS

| 4,916,539 A | 4/1990 | Galumbeck | 358/142 |
| 5,341,474 A | 8/1994 | Gelman | 395/200 |

(Continued)

FOREIGN PATENT DOCUMENTS

| AU | 20080/92 | 11/1992 |
| EP | 1003304 | 5/2000 |

(Continued)

OTHER PUBLICATIONS

"Sneak Prevue promotion distribution and broadcast system", Refer to attached Oct. 21, 2008 document entitled Statement of Grounds & Particulars of Opposition, p. 12, paragraph 4.3.2, Date of publication not provided.

*Primary Examiner* — Jeremy Duffield
(74) *Attorney, Agent, or Firm* — Harrington & Smith

(57) ABSTRACT

A media playout system for playing out media to receiver units, the system comprising: a broadcast data channel; a playout arrangement for broadcasting over the broadcast data channel enhanced content data associated with video data; a distribution unit for receiving the broadcast data and distributing it to the receiver units, and comprising a buffer for storing enhanced content data, and a transmission controller responsive to signalling from the playout arrangement to retrieve enhanced content data from the buffer and make it available to the receiver units.

20 Claims, 3 Drawing Sheets

(56) References Cited

U.S. PATENT DOCUMENTS

| | | | |
|---|---|---|---|
| 5,421,031 A * | 5/1995 | De Bey | 725/92 |
| 5,600,364 A * | 2/1997 | Hendricks et al. | 725/9 |
| 5,600,573 A * | 2/1997 | Hendricks et al. | 725/109 |
| 5,619,274 A | 4/1997 | Roop et al. | 348/461 |
| 6,052,715 A | 4/2000 | Fukui | 709/217 |
| 6,526,575 B1 * | 2/2003 | McCoy et al. | 725/36 |
| 6,578,201 B1 * | 6/2003 | LaRocca et al. | 725/86 |
| 6,799,326 B2 * | 9/2004 | Boylan et al. | 725/35 |
| 7,002,918 B1 * | 2/2006 | Prieto et al. | 370/252 |
| 2001/0014975 A1 | 8/2001 | Gordon | 725/91 |
| 2001/0039664 A1 | 11/2001 | Sibley | 725/136 |
| 2002/0144283 A1 * | 10/2002 | Headings et al. | 725/109 |
| 2002/0147984 A1 * | 10/2002 | Tomsen et al. | 725/109 |
| 2003/0018968 A1 * | 1/2003 | Avnet | 725/32 |
| 2003/0084453 A1 * | 5/2003 | Laughlin et al. | 725/60 |
| 2005/0193410 A1 * | 9/2005 | Eldering | 725/34 |
| 2006/0117340 A1 * | 6/2006 | Pavlovskaia et al. | 725/34 |

FOREIGN PATENT DOCUMENTS

| | | |
|---|---|---|
| EP | 1003304 A1 | 5/2000 |
| EP | 1039753 | 9/2000 |
| EP | 1039753 A2 | 9/2000 |
| EP | 1039753 A3 | 1/2004 |
| WO | WO 9831148 | 7/1998 |
| WO | WO-01/33852 A1 | 5/2001 |
| WO | WO 0133852 | 5/2001 |
| WO | WO-01/72040 A2 | 9/2001 |
| WO | WO 0172040 | 9/2001 |
| WO | WO-02/19720 A2 | 3/2002 |
| WO | WO-02/43396 A2 | 5/2002 |

* cited by examiner

-- Prior Art --

MEDIA PLAYOUT SYSTEM

FIELD OF THE INVENTION

This invention relates to the broadcasting and playout of media, and in particular to video and enhanced content data in interactive television systems.

BACKGROUND OF THE INVENTION

In prior interactive TV systems, video data and any related enhanced content data are typically transmitted from a series of providers to a distribution station. From this distribution station, the data will be broadcast to a series of local transmitters from where it will be distributed to individual receivers, e.g. at houses. The video and enhanced content data can then be retrieved by users and displayed onto televisions.

The interactive TV system 10 of FIG. 1 comprises a series of providers 11a-c of video data and enhanced content data associated with (but carried by separate channels from) the video data. Each provider 11a-c transmits the enhanced content data to a distribution station 12. The distribution station 12 then broadcasts the data to a series of transmitters 13, only one of which is shown in FIG. 1. Transmitters are installed in each geographical area where the video data and enhanced content data are to be provided to viewers. These local transmitters 13 distribute the data to individual receivers 14a-c. The transmission of the data from the distribution station 12 to the transmitters 13 is done by a broadcast means: for example the distribution station could send the data over an uplink to a satellite, which could relay the data down to the transmitters 13. The transmission of the data from the transmitters 13 to the receivers 14 could be done by a local broadcast system, for example using radio or cable. To receive the data from the transmitters 13 the receivers may include aerials or satellite dishes, or units for receiving data transmitted by cable.

This system has the following disadvantage. If a popular television event such as a sports match is being broadcast at a particular time, then it can be expected that large amounts of data will be transmitted, in the form of enhanced content from data providers to receivers, and also from receivers back to an arrangement for receiving and analysing responses, in addition to the video data. Large amounts of bandwidth will be required for transmission during such a media-intensive event. This could be a particular problem when the data is distributed over a point-to-point channel such as the back channel (e.g. DOCSIS or modem) whose bandwidth is likely to be strictly limited, since in a point-to-point system the data must be transmitted separately to each receiver.

In relation to broadcast channels, normally a set amount of bandwidth is available for each channel. One possibility might be to reduce the bandwidth available to one channel so as to allow another channel to use an increased amount of bandwidth. However, if the data for the channels are provided by different sources it may not be possible to rely on one channel being able to use only a small amount of bandwidth at the time when the other channel requires an increased allocation.

SUMMARY OF THE INVENTION

It is an object of the present invention to provide an improved system for playing out enhanced content data.

According to one aspect of the present invention there is provided a media playout system for playing out media to receiver units, the system comprising: a broadcast data channel; a playout arrangement for broadcasting over the broadcast data channel enhanced content data associated with the video data; a distribution unit for receiving the broadcast data and distributing it to the receiver units, and comprising a buffer for storing enhanced content data, and a transmission controller responsive to signalling from the playout arrangement to retrieve enhanced content data from the buffer and make it available to the receiver units.

Suitably the playout arrangement could also have a buffer for storing enhanced content data. The playout arrangement could suitably broadcast enhanced content data in advance of a time scheduled for its transmission to receiver units. This scheduled time may be determined by a program schedule giving a schedule of all TV programs to be transmitted in a certain time period. Thus, the time scheduled for the transmission of the enhanced content data could, for example, be the time at which a TV program is due to start.

Alternatively, the time scheduled for the transmission of the enhanced content data could be defined in terms of a video signal containing an identifying marker embedded in a TV program with which the enhanced content is associated. The video signal could comprise a timing stream with which the playout of the enhanced content data could be synchronised. Thus the scheduled time for the transmission of the enhanced content could, for example, be a point in the timing stream of the video signal.

The playout arrangement could suitably signal the distribution unit when it is required to make the enhanced content available to the receiver units, i.e. at the time scheduled for the transmission of the enhanced content. At this time, the playout arrangement could suitably broadcast the stored enhanced content data to the distribution unit to make the enhanced content data available to the receiver units.

Suitably the receiver units could be user operable to receive video data and associated enhanced content data from the distribution unit. The receiver units could be set-top boxes.

The receiver units could suitably be arranged to cause the received video data and enhanced content to be displayed to a user by means of a television.

Preferably the transmission controller is responsive to signalling from the playout arrangement to delete enhanced content data from the buffer of the distribution unit.

Suitably the playout arrangement could comprise a media converter for converting enhanced content data onto a plurality of formats each capable of being interpreted by a respective type of receiver unit.

According to a second aspect of the present invention there is provided a method for playing out media to receiver units, for example in a media playout system as described above, the method comprising: broadcasting the enhanced content data from the playout arrangement in advance of a time scheduled for its transmission to the receiver units; signalling the distribution unit to make the enhanced content data available to the receiver units at the scheduled time; and broadcasting the stored enhanced content to the distribution unit at the scheduled time.

Preferably the method could include signalling the distribution unit to delete enhanced content data from the buffer of the distribution unit.

BRIEF DESCRIPTION OF THE DRAWINGS

The present invention will now be described in detail with reference to the accompanying drawings in which like reference numerals refer to like parts.

DETAILED DESCRIPTION

Figure 1:
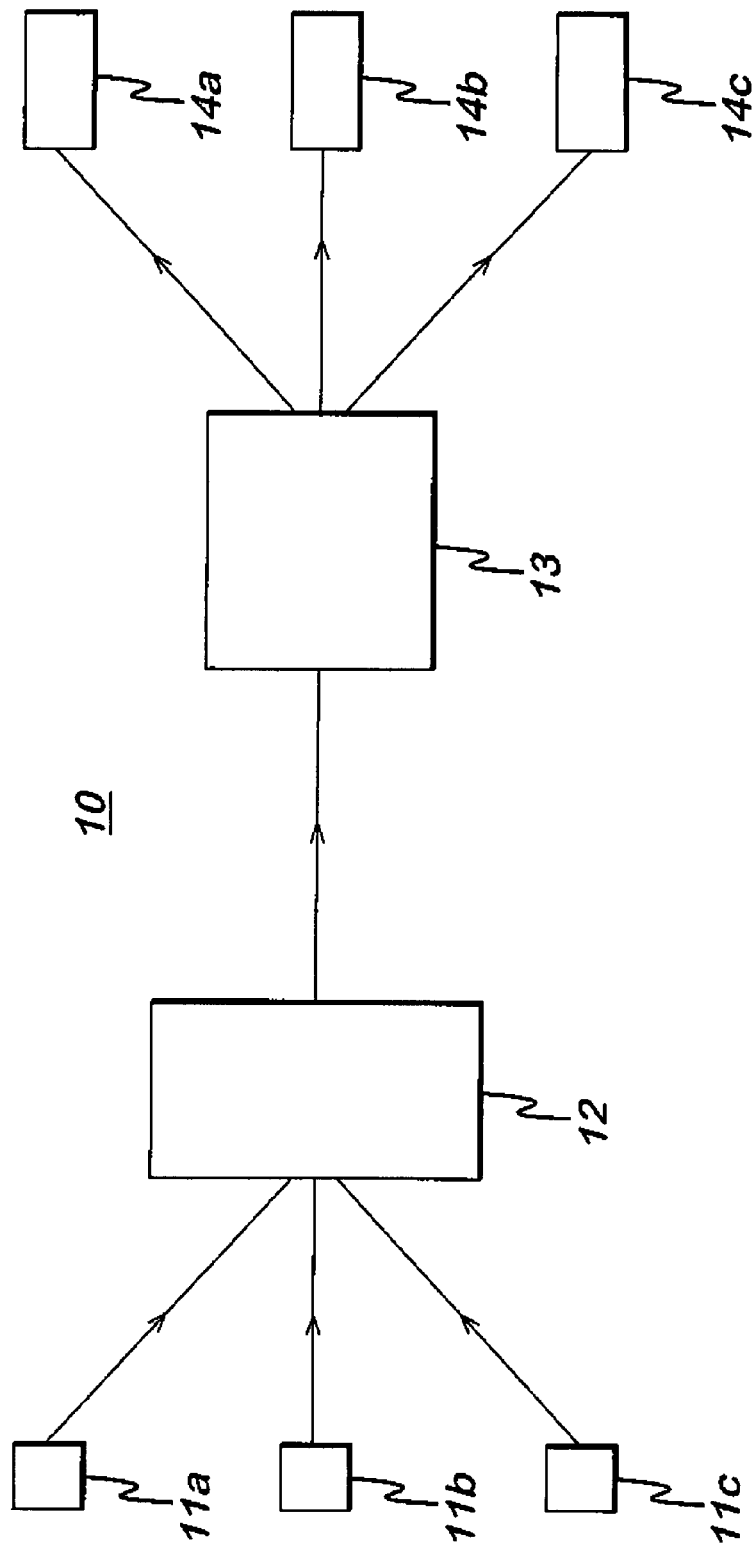
FIG. 1 shows a prior art interactive television system.
Figure 2:
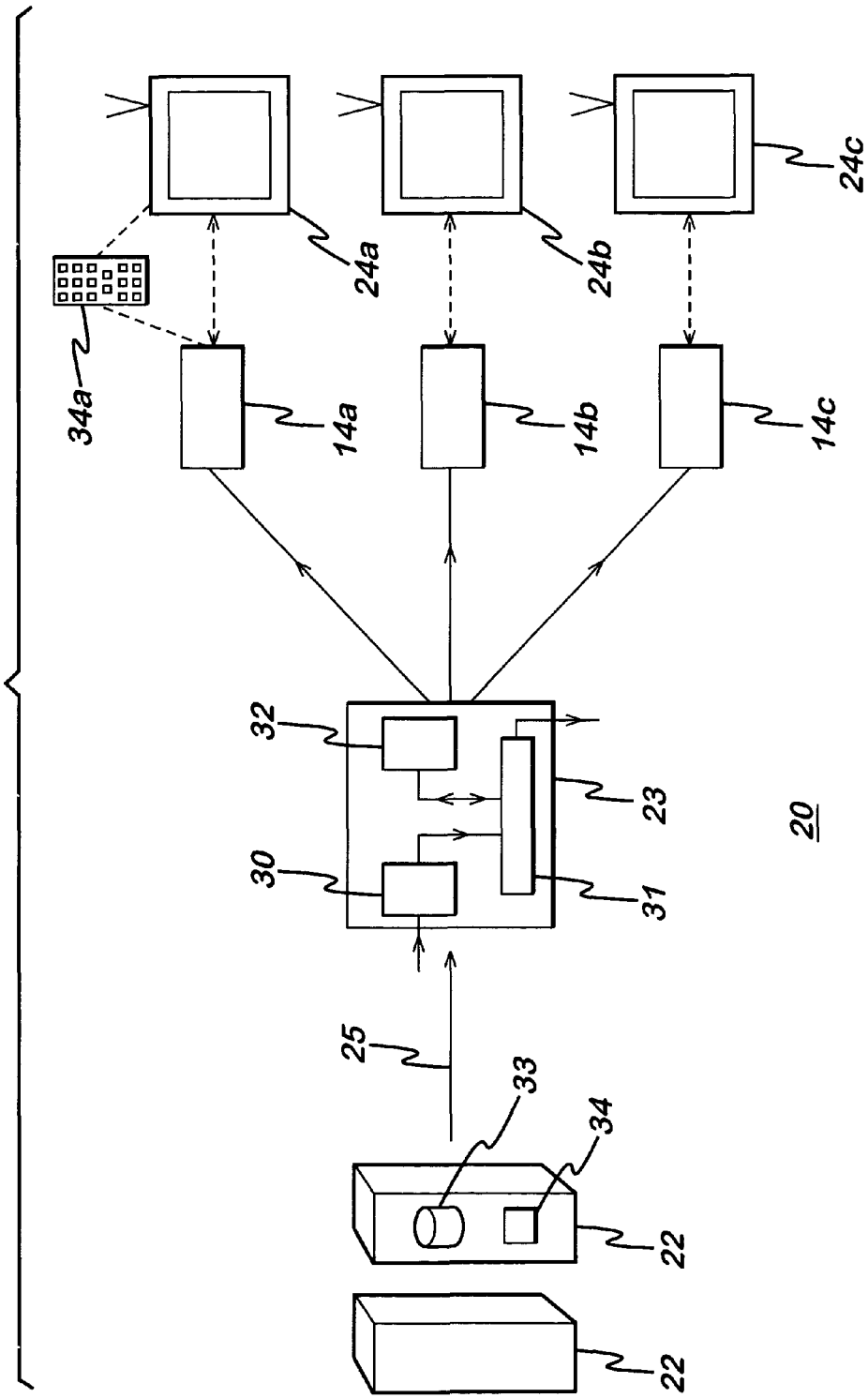
FIG. 2 shows an interactive television system with a distribution unit comprising a buffer.

FIG. 2 shows a system in accordance with the present invention. In FIG. 2 there is a system 20 which includes a playout arrangement 22 and a distribution unit 23. Providers (not shown in FIG. 2) transmit video data and enhanced content data associated with the video data to the playout arrangement 22. The playout arrangement 22 then broadcasts the data over a broadcast data channel 25 to a distribution unit 23. In a typical system, a plurality of distribution arrangements would be provided, and would be spread out geographically across the area intended to receive the video and enhanced content data.

The video data and enhanced content data enters the distribution unit at input 30. The data is subsequently stored in a buffer 31, either until it is required for transmission to a receiver unit for being displayed, or until it is deleted from the distribution unit.

Playout arrangement 22 is arranged to signal to the distribution unit 23. Signals from the playout arrangement are received at the distribution unit, and a transmission controller 32 is responsive to the signals. The playout arrangement will signal to the distribution unit in advance of a time scheduled for the transmission of the enhanced content data to the receiver units. In response to this signal, the transmission controller will retrieve the enhanced content from the buffer 31 and make it available to the receiver units 14a-c.

Receiver units 14a-c are arranged to receive data from the distribution unit 23. Each receiver unit can be connected to at least one television 24a-c to display video data and enhanced content data requested by a user. If a user of receiver unit 14a is watching a particular TV channel on TV 24a, he or she may desire simultaneously to view enhanced content associated with that TV channel. The user could request to the receiver unit 14a, via a user input device 34a such as a remote control, to view the appropriate enhanced content. The receiver unit 14a would then display the requested pages of enhanced content on the TV 24a.

In operation, the data providers could each provide a feed that corresponds to a television or other channel. Programmes on that channel could include video and/or audio, together optionally with enhanced content such as supporting single or multimedia pages. A feed could be streamed to the playout arrangement in real time, in which case it would be transmitted by the playout arrangement directly to the distribution unit 23 with a command that it is then to be released directly to the receiver units 14. Alternatively, some or all of a feed could be transmitted by the provider to the playout arrangement in advance of the time scheduled for its release to the receiver units 14. The data that is transmitted in advance preferably represents one or more self-contained programme items, for example single shows.

When some data of a feed is transmitted to the playout arrangement in advance of the time scheduled for its release, the playout arrangement may buffer it locally in store 33 before transmitting it to the distribution units. The data could be buffered at the playout arrangement until the time scheduled for its release, and then transmitted to the distribution arrangements. However, since the distribution arrangements have their own buffers, the data could be transmitted to the distribution arrangements in advance of the time scheduled for its release together with a command that it is to be buffered in buffer 31 and not released, and then a command sent to cause the data to be released at the scheduled time. Thus the presence of buffers in the playout arrangement 22 and the distribution arrangements provides considerable flexibility in the timing of the transmission of the data over link 25: it can essentially be transmitted over that link at any time between being received at the playout arrangement and the time when it is scheduled to be transmitted.

A data flow controller 34 in the playout arrangement determines when the data is to be transmitted over link 25. Data that is not received in advance is transmitted immediately. Data that is received in advance is buffered in store 33 and then based on the expected load over link 25 the controller 34 determines when to transmit the data. This means that the bandwidth of link 25 can be used more effectively than in a system in which all data is sent in real time. For example, in a system where all data is sent in real time it is difficult to temporarily allocate more bandwidth to one feed than to another. However, this can be achieved in the present system by transmitting some or all of the data for the feed across the link 25 in advance of the time scheduled for its release. This is significant since the broadcast link 25 will generally be severely bandwidth limited.

In one preferred scheme, the data that is transmitted in advance over the link 25 is just the enhanced content: the associated video and/or audio programme data is transmitted in real time. This allows the system to deal with programs that include a large amount of enhanced content, without reducing the bandwidth available to the associated video and/or audio.

When data is to be released by the distribution arrangement it is transmitted by the distribution arrangement to those receivers that have requested it (in a cable-type or point-to-point local distribution system) or is broadcast so as to be capable of being received by all the receivers (in a broadcast local distribution system).

There are several ways in which the bandwidth to be allocated to a channel can be set. Preferably the following three ways are available:

1. a fixed amount of bandwidth is allocated to each channel and for each type of decoder (STB) platform that is to receive data over the channel;
2. a fixed amount of bandwidth is allocated to each channel, and the amount of bandwidth within that allocation that is allocated to each type of (STB) platform that is to receive data over the channel is allocated dynamically;
3. a fixed amount of bandwidth is allocated to a set of two or more channels.

When a fixed amount of bandwidth is reserved for a particular channel, the bandwidth is allocated per type of supported STB for that channel. Even if no enhanced content is being played out, the bandwidth is reserved and allocated.

When the available bandwidth on a channel is allocated dynamically for each of the supported types of STBs per channel the bandwidth is allocated in such a way that the time needed to broadcast a full set of enhanced content is the same for each type of supported STB. In this way the allocated bandwidth is used to compensate for the differences in size among the enhancements for the different types of STBs.

When the bandwidth is allocated for a set of channels, the bandwidth allocated is divided among the channels that require the bandwidth from time to time. In this way bandwidth is only allocated for the channels that actually do play out enhancements.

Figure 3:
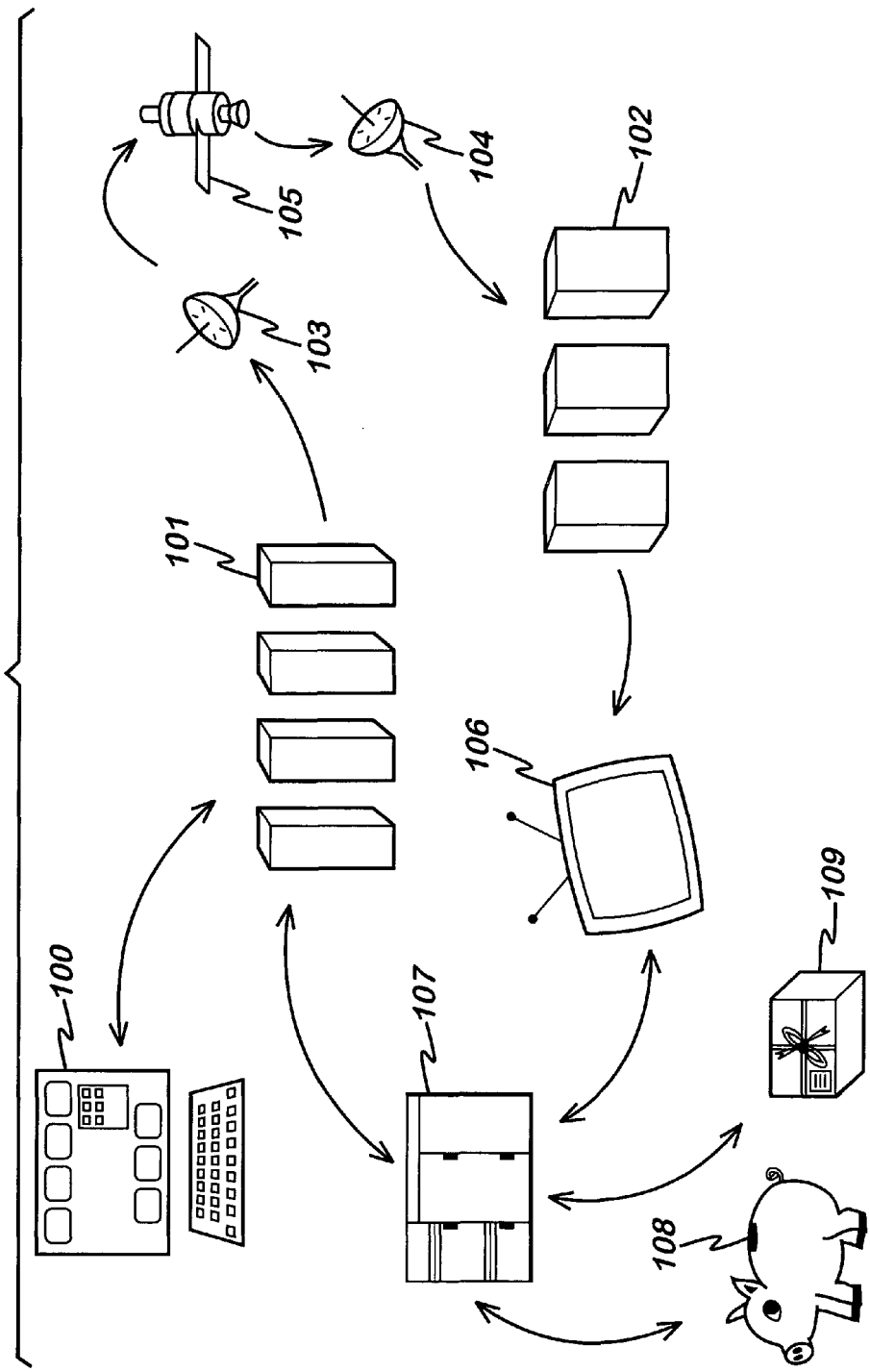
FIG. 3 shows an interactive television network.

FIG. 3 shows an example of a broadcast network in which the present system may be employed.

The network shown in FIG. 3 comprises an Edit Suite 100, a Playout Management Centre 101, a Media Control Manager 102, uplink and downlink stations 103 and 104, a satellite 105, a decoder 106, and a Transaction Management System 107. The decoder 106 may, for example, be a set-top box or a digital television. Each of the components of the system will be described in turn. The components can communicate with each other as indicated by the arrows in FIG. 3.

Interactive content is produced at the Edit Suite 100 (specifically, in a Content Production Manager (CPM)) on generic re-usable templates. The general templates can be manipulated by designers to produce a template with the desired format for a particular application. This specific template can then be saved to the memory of the CPM. Subsequent data can be added easily and quickly to the application-specific template, for example, daily news, weather or TV guides.

Once data has been added to a template at a CPM, the populated template is inputted to an Event Broker Console (EBC), the second stage of an Edit Suite, where it has a stream script added to it.

Meta-data is then added to the main broadcast stream (i.e. the video stream) that is associated with the content of the template. The meta-data allows the stream script to be triggered in real-time to synchronise the content with the main broadcast stream. For live television events, the EBC can be used to manage the broadcast of interactive pages, as will be described later.

Following production at the Edit Suite, the template data is passed to a Playout Management Centre (PMC) 101, which converts the data to a signal (representing pages of interactive content) in the relevant format for any platform on which it is to be received and displayed. The PMC can store the interactive content until it is needed. Once the interactive content is required, it is transmitted to a Media Control Manager (MCM) 102. To reach the MCM the interactive content could be sent to an uplink station 103 and transmitted via a satellite 105 to a downlink station 104 or could be sent in another way, for instance by cable.

The MCM 102 is located in a cable TV digital head end. The MCM receives interactive data from a PMC 101, stores it until it is to be played out, and, in response to receiving a trigger, broadcasts it to decoders 106. The decoders could be set-top boxes connected to televisions, or they could be digital televisions.

The MCM can be informed in a number of ways of when to cause a page of interactive content to be played out, by being transmitted from the MCM to the decoder 106, and subsequently displayed. For example, if the television event to which the interactive content is related is being broadcast live, then an editor at an Edit Suite 100 can manually trigger the play-out of the content from the MCMs 102, to ensure that the content is synchronised with an appropriate part of the television event. A trigger would be sent from the Edit Suite 100 to the PMC 101; the PMC would transcode the trigger and forward it to the MCM 102, and then the MCM would broadcast the trigger towards decoders 106. Alternatively, triggers can be arranged to be sent automatically at pre-determined times during a television event. In this case, the MCM has access to a time schedule and on the basis of this schedule, sends triggers to decoders at the times when it is desired for the interactive content to be played out. For instance, a TV programme might start at 7:30pm, and triggers could then be sent automatically from the MCM 102 at 7:31pm, 7:35pm, 7:42pm and so on, depending on the parts of the programme with which each page of interactive content is related. As another alternative, markers could be embedded in the video signal associated with a particular set of interactive pages, and triggers could be generated in dependence on the association between the markers and the pages. These markers would be the meta-data referred to above which is added to the video stream.

The MCM 102 can also manage the bandwidth allocated to video signals and interactive content signals according to television events taking place. Content can also be stored/buffered at the MCM.

A Transaction Management System (TMS) 107 is employed to deal with responses of subscribers to the interactive content broadcast. The TMS is capable of handling large numbers of concurrent responses, and can produce, for example, lists of winners of a competition following the subscriber responses. The TMS is linked to the PMC so that information related to subscriber responses can be fed back and inserted into broadcasts from the MCM 102. In addition, the PMC can communicate with the TMS.

For handling payments to action user responses the TMS is linked to a banking system 108. The TMS may send signals to other functions such as a third party fulfilment centre 109 so as to action user responses, for example to fulfil purchases or issue prizes.

Editors at the Edit Suites 100 can communicate with the TMS 107 via PMC 101 in order to determine how the TMS should react to responses sent from subscribers.

In the network of FIG. 3, the Playout Management Centre 101 may comprise the signal formatting apparatus 20 of FIG. 2.

In a system as described above with reference to FIG. 3, there would typically be multiple Edit Suites 100, one PMC 101, multiple MCMs 102 distributed geographically across an area served by the network, and one TMS 107, although in future it may be desirable in terms of efficiency to provide multiple PMCs and/or TMSs. Decoders 106 would be positioned locally to individual viewers, for example in their homes or in public buildings.

In the network of FIG. 3, the PMC 101 may comprise the playout arrangement 22 of FIG. 2. The MCM 102 of FIG. 3 may suitably be the distribution unit 23 of FIG. 2.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

I claim:

1. A media playout system within a broadcast network for playing out media to receiver units, the system comprising:
    a broadcast data channel with an associated bandwidth;
        a playout arrangement for broadcasting broadcast data comprising video data and enhanced content data associated with the video data over the broadcast data channel, the broadcast data being transmitted by a data provider to the playout arrangement;
        a plurality of distribution units distributed geographically across an area served by the network for receiving the broadcast data and distributing the broadcast data to receiver units wherein said receiver units comprise at least two types of receiver units, each distribution unit comprising:
    a buffer for storing enhanced content data in advance of a scheduled time,
    a receiver for receiving the video data, and
        a transmission controller for receiving a command from the playout arrangement to release the video data and the enhanced content data to the receiver units at the scheduled time and, responsive to the command, retrieving the enhanced content data from the buffer and releasing the enhanced content data and the video data to the receiver units at the scheduled time, wherein the playout arrangement comprises a buffer for storing the enhanced content data and a data flow controller for determining when the broadcast data is to be transmitted over the broadcast data channel, the playout arrangement being operable to:
a. store enhanced content data associated with the video data when the enhanced content data is transmitted by the data provider to the playout arrangement in advance of the scheduled time;
b. broadcast the enhanced content data to the plurality of distribution units in advance of the scheduled time, and based on an expected load over the broadcast data channel the data flow controller is arranged to determine when to broadcast, the scheduled time being the time scheduled for transmission of the enhanced content data and the video data to the receiver units;
c. broadcast the video data to the plurality of distribution units at the scheduled time; and
d. signal the plurality of distribution units to transmit the video data and the enhanced content data to the receiver units at the scheduled time wherein the bandwidth of the broadcast data channel is allocated for each type of the said at least two types of receiver units per type of receiver unit and wherein each receiver unit is configured to enable the enhanced content data to be displayed simultaneously with the video data in response to a user input; and wherein each transmission controller is responsive to signalling from the playout arrangement to delete the enhanced content data from the buffer of the respective distribution unit.

2. A media playout system as claimed in claim 1, wherein the receiver units are operable by a user to receive the video data and the associated enhanced content data from the distribution units.

3. A media playout system as claimed in claim 2, wherein the receiver units are set-top boxes.

4. A media playout system as claimed in claim 1, wherein the receiver units are arranged to cause the video data and the enhanced content data to be displayed to a user by means of a television.

5. A media playout system as claimed in claim 1, wherein the playout arrangement comprises a media converter for converting the enhanced content data into a plurality of formats each capable of being interpreted by a respective type of receiver unit.

6. A method for playing out media to receiver units so that enhanced content data and video data can be simultaneously displayed to a user, in a media playout system within a broadcast network, the method comprising:

broadcasting the enhanced content data from a playout arrangement in advance of a time scheduled for its transmission to receiver units;

signalling a plurality of distribution units to make the enhanced content data and the video data available to the receiver units at the scheduled time, the media playout system comprising:

a broadcast data channel with an associated bandwidth;

the playout arrangement for broadcasting over the broadcast data channel broadcast data comprising the video data and the enhanced content data associated with the video data, the broadcast data being transmitted by a data provider to the playout arrangement;

the plurality of distribution units distributed geographically across an area served by the network for receiving the broadcast data and distributing the broadcast data to the receiver units wherein said receiver units comprise at least two types of receiver units, each of the plurality of distribution units comprising;

a buffer for storing the enhanced content data, a receiver for receiving the video data, and a transmission controller for receiving a command from the playout arrangement to release the video data and the enhanced content data to the receiver units at the scheduled time and, responsive to the command, retrieving the enhanced content data from the buffer and releasing the video data and the enhanced content data available to the receiver units at the scheduled time, wherein the playout arrangement comprises a buffer for storing the enhanced content data and a data flow controller for determining when the broadcast data is to be transmitted over the broadcast data channel, the playout arrangement is operable to:
a. store enhanced content data associated with the video data when the enhanced content data is transmitted by the data provider to the playout arrangement in advance of the scheduled time;
b. broadcast the enhanced content data to the plurality of distribution units in advance of the scheduled time, and based on an expected load over the broadcast data channel the data flow controller is arranged to determine when to broadcast, the scheduled time being the time scheduled for transmission of the enhanced content data and the video data to the receiver units;
c. broadcast the video data to the plurality of distribution units at the scheduled time; and
d. signal the plurality of distribution units to transmit the video data and the enhanced content data to the receiver units at the scheduled time wherein the bandwidth of the broadcast data channel is allocated for each type of the said at least two types of receiver units per type of receiver unit and wherein each receiver unit is configured to enable the enhanced content data to be displayed simultaneously with the video data in response to a user input; and signalling each distribution unit to delete the enhanced content data from the buffer of the respective distribution unit.

7. A method as claimed in claim 6, further comprising causing displaying of the video data and the enhanced content data to a user by means of a television.

8. A method as claimed in claim 6, further comprising causing displaying of the video data and the enhanced content data to a user by means of a television.

9. A method as claimed in claim 8, wherein the user is enabled to selectably display the enhanced content data with the display of the video data.

10. A method as claimed in claim 9, wherein the display unit is a television set.

11. A media playout system as in claim 1, wherein a user selects whether to simultaneously display the enhanced content with the video data.

12. A media playout system as in claimed in claim 11, wherein the video data is displayable on the display unit.

13. A media playout system as in claimed in claim 11, wherein the video data is displayable on a television set.

14. A media playout system as claimed in claim 1, wherein the bandwidth allocated for each type of the said at least two types of receiver units is fixed per type of receiver unit.

15. A media playout arrangement as claimed in claim 1, wherein the bandwidth allocated for each type of the said at least two types of receiver units is allocated dynamically.

16. A media playout arrangement as claimed in claim 15, wherein the bandwidth is allocated dynamically such that the time needed to broadcast the enhanced content data over the broadcast data channel is the same for each type of the said at least two types of receiver units.

17. A method as claimed in claim 6, wherein the bandwidth allocated for each type of the said at least two types of receiver units is fixed per type of receiver unit.

18. A method as claimed in claim 6, wherein the bandwidth allocated for each type of the said at least two types of receiver units is allocated dynamically.

19. A method as claimed in claim 18, wherein the bandwidth is allocated dynamically such that the time needed to broadcast the enhanced content data over the broadcast data channel is the same for each type of the said at least two types of receiver units.

20. A media playout system within a broadcast network for playing out media to receiver units, the system comprising:
   a broadcast data channel with an associated bandwidth;
      a playout arrangement for broadcasting broadcast data comprising video data and enhanced content data associated with the video data over the broadcast data channel, the broadcast data being transmitted by a data provider to the playout arrangement;
      a plurality of distribution units distributed geographically across an area served by the network for receiving broadcast data and distributing the broadcast data to receiver units wherein said receiver units comprise at least two types of receiver units, each distribution unit comprising:
   a buffer for storing enhanced content data in advance of a scheduled time,
   a receiver for receiving the video data, and
      a transmission controller for receiving a command from the playout arrangement to release the video data and the enhanced content data to the receiver units at the scheduled time and, responsive to the command, retrieving the enhanced content data from the buffer and releasing the enhanced content data and the video data to the receiver units at the scheduled time,
   wherein the playout arrangement comprises a buffer for storing the enhanced content data and a data flow controller for determining when the broadcast data is to be transmitted over the broadcast data channel, the playout arrangement being operable to:
   a. store enhanced content data associated with the video data when the enhanced content data is transmitted by the data provider to the playout arrangement in advance of the scheduled time;
   b. broadcast the enhanced content data to the plurality of distribution units in advance of the scheduled time, and based on an expected load over the broadcast data channel the data flow controller is arranged to determine when to broadcast, the scheduled time being the time scheduled for transmission of the enhanced content data and the video data to the receiver units;
   c. broadcast the video data to the plurality of distribution units at the scheduled time; and
   d. signal the plurality of distribution unit to transmit the video data and the enhanced content data to the receiver units at the scheduled time
   wherein the bandwidth of the broadcast data channel is allocated for each type of the said at least two types of receiver units per type of receiver unit and wherein each receiver unit is configured to enable the enhanced content data to be displayed simultaneously with the video data in response to a user input;
   wherein the bandwidth is allocated dynamically such that the time needed to broadcast the enhanced content data over the broadcast data channel is the same for each type of the said at least two types of receiver units; and
   wherein each transmission controller is responsive to signalling from the playout arrangement to delete the enhanced content data from the buffer of the respective distribution unit.

* * * * *